UNITED STATES PATENT OFFICE 2,370,020

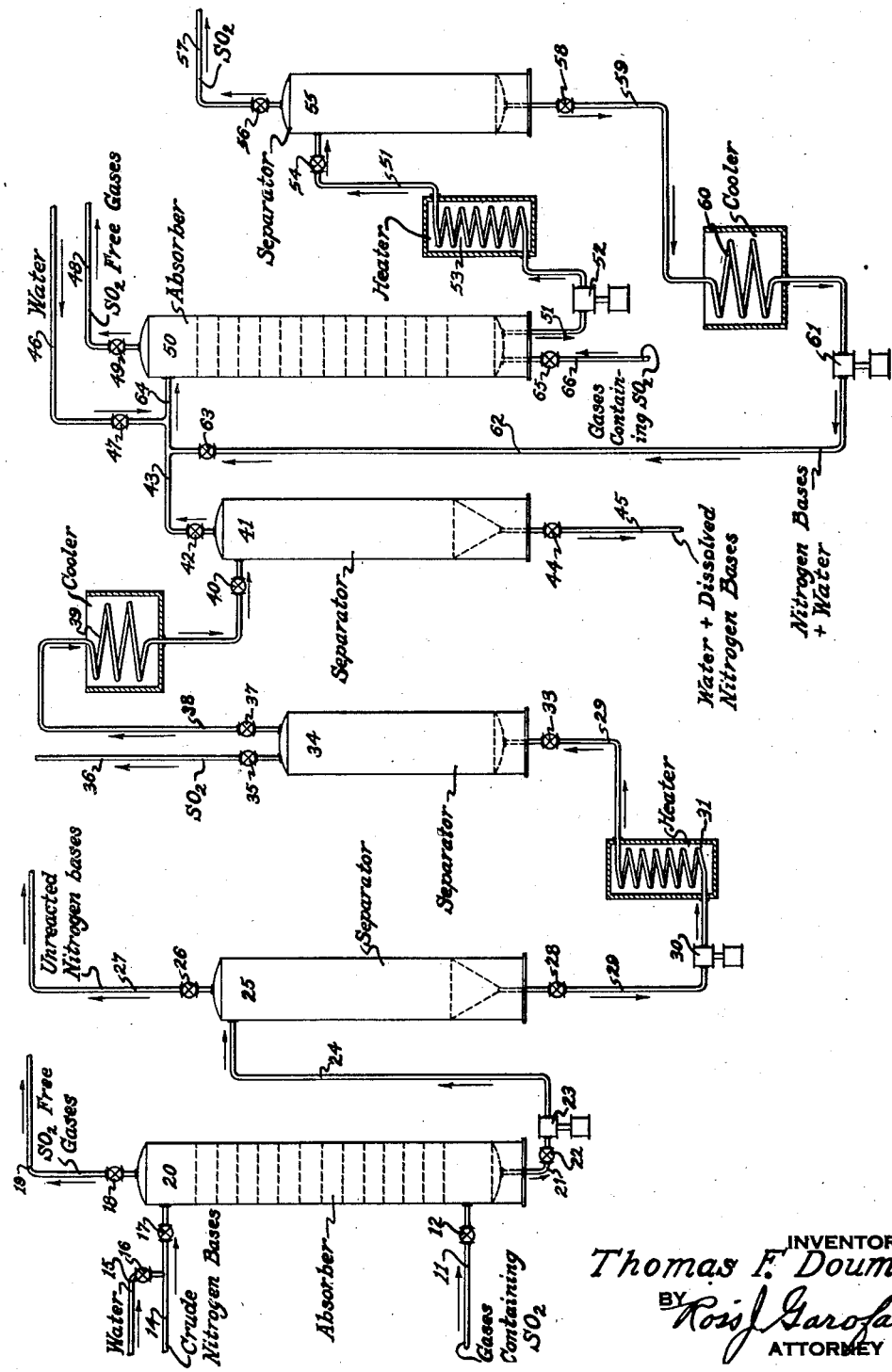

PROCESS FOR THE SEPARATION OF SULPHUR DIOXIDE FROM GASES

Thomas F. Doumani, Wilmington, Calif., assignor to Union Oil Company of California, Los Angeles, Calif., a corporation of California Application August 16, 1941, Serial No. 407,240

3 Claims. (Cl. 23—178)

This invention relates to the recovery of sulphur dioxide from gases containing the same such as sulphur-containing gases obtained from the regeneration with air of catalysts employed in the catalytic treatment of sulphur-bearing petroleum fractions, the burning of sulphite ores to oxides as in smelting operations, the burning of high sulphur coals, etc.

It is an object to employ mixtures of nitrogen bases and water for absorbing sulphur dioxide in order to separate the latter from other gases contained in the gaseous mixture.

It is a further object to employ complex mixtures of nitrogen bases and water which possess a high reactivity for sulphur dioxide and an ease of regeneration of the original nitrogen bases by the application of heat. Another object is to employ a cyclic process for the absorption and separation of the sulphur dioxide from the gases.

The use of nitrogen bases for the absorption of sulphur dioxide is not new. Some organic nitrogen bases which have heretofore been employed are aniline and its homologs (British Patent 371,888), dimethylaniline (U. S. Patent 2,186,453), and quinoline (U. S. Patent 1,972,074). The absorption of sulphur dioxide with nitrogen bases in the presence of liquid water and the dissociation or regeneration of the water soluble-nitrogen base-sulphurous acid compound can be represented by the equation:

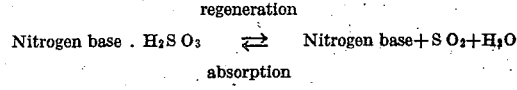

$$\text{Nitrogen base} \cdot H_2SO_3 \underset{\text{absorption}}{\overset{\text{regeneration}}{\rightleftarrows}} \text{Nitrogen base} + SO_2 + H_2O$$

In general, only one or a mixture of two nitrogen bases have heretofore been used in any mixture for absorbing sulphur dioxide. When employing mixtures consisting of a large number of nitrogen bases and water, difficulty has hitherto been encountered in obtaining those nitrogen bases which have a high reactivity for sulphur dioxide and an ease of regeneration of the nitrogen bases by the application of heat. By fractionating complex mixtures of nitrogen bases into various cuts, I have found that certain of them possess somewhat desirable absorption and regeneration properties. This fractionation to separate the desirable complex mixture of nitrogen bases, however, is a tedious and wasteful process, for it affords inadequately by physical means what I now am able to obtain very efficiently, economically, and simply by chemical means. Thus, I have discovered that mixtures of nitrogen bases which possess the previously mentioned desirable properties can be obtained by a simple chemical process and can be subsequently used in a cyclic process for absorbing sulphur dioxide from gases containing the same.

According to my invention, the crude nitrogen bases obtained from petroleum, coal tar, bone oil or mixtures of these without previous purification and fractionation are mixed with water and this mixture is conducted into a suitable gas absorption apparatus, where adequate means for intimate contact of a sulphur dioxide-containing gas and nitrogen base-water mixture can be obtained. It is preferable to employ the absorption tower to be used for the cyclic absorption of the sulphur dioxide, or a tower of similar design, and the same concentration of sulphur dioxide as will be used in the cyclic process, since it is desirable to simulate the absorption conditions as closely as possible. The sulphur dioxide-containing gas to be stripped of sulphur dioxide is passed countercurrent to the crude nitrogen base-water mixture for a suitable time and at a relatively low temperature. Thus, the time and temperature as well as the liquid and gas velocities should be substantially the same as will be realized in the cyclic process for the absorption of the sulphur dioxide, so as to obtain substantially the same absorption coefficients and other controlling conditions and thus obtain those nitrogen bases from the complex mixture which possess the desired reactivity, so as to be usable under the cyclic operating conditions. The non-basic impurities in the crude, complex nitrogen base mixture, as well as those bases which did not form a water-soluble compound with the sulphur dioxide are readily removed by a liquid gravity separator as an oil less dense than the aqueous layer. Those nitrogen bases which are found with the non-basic impurities are mostly very weak bases whose sulphurous acid compounds are hydrolyzed or dissociated to the original bases during the absorption operation and consequently are not used for this process. The water phase containing the dissolved nitrogen base-sulphurous acid compounds is now heated to approximately its boiling point for any predetermined time period, preferably the same length of time as will be used in the cyclic operating conditions for absorbing the sulphur dioxide. The nitrogen bases which are dissociated from their sulphurous acid compounds by this heating separate as an oil less dense than the aqueous layer from which they may be readily separated and used in the subsequent cyclic absorption and regeneration process. The aqueous layer contains some nitrogen bases which were not dissociated by the heating process (viz., stronger bases than desired); consequently, they are not usable in the cyclic process.

Other objects, features and advantages of my invention will become apparent to one skilled in the art from the following description of my invention as taken from the drawing which represents a diagrammatic flow sheet of one method of carrying out my invention.

In the drawing, two each of the following are used: Countercurrent gas absorbers 20 and 50, gravity liquid separators 25 and 41, gas-liquid separators 34 and 55, heaters 31 and 53, and coolers 39 and 60. Referring to the drawing, the gases containing sulphur dioxide are passed through line 11 controlled by valve 12 into the absorber 20 and meet countercurrently the crude nitrogen bases introduced into the absorber via line 14 and water via line 15, which pass together through valve 17 into the absorber 20. The sulphur dioxide free gases leave the system at the top of the absorber through line 19 controlled by valve 18. The spent nitrogen bases are withdrawn via line 21, controlled by valve 22 and are now transported by pump 23, through line 24, into separator 25, from which the unreacted nitrogen bases are removed via line 27 controlled by valve 26 as an oily liquid less dense than the aqueous layer. The aqueous layer is passed by gravity through line 29 controlled by valve 28 and by pump 30 to heater 31 where the nitrogen base sulphurous acid compounds are decomposed by heating the aqueous solution which passes through line 29, controlled by valve 33 into separator 34 in which sulphur dioxide is evolved and passes via line 36 controlled by valve 35. The warm nitrogen base-water mixture is now passed to cooler 39 via line 38 controlled by valve 37 and then to separator 41 through valve 40. The water containing dissolved nitrogen bases is removed from the separator via line 45 controlled by valve 44, the nitrogen bases existing mostly as the sulphurous acid compounds of the nitrogen bases.

The desired nitrogen bases are passed through valve 42 and line 43 where they are mixed with water introduced via line 46 controlled by valve 47 and the mixture is passed via line 64 into absorber 50. In the absorber, this mixture is passed countercurrently to the gases containing sulphur dioxide introduced via line 66, controlled by valve 65 wherein the sulphur dioxide contained in the gases is absorbed by the liquid mixture containing the nitrogen bases. The gases leave the absorber through line 48 and valve 49 substantially free of sulphur dioxide. The spent nitrogen bases leave the bottom of the absorber via line 51 and are transported by pump 52 through heater 53 where the sulphurous acid nitrogen base compounds are decomposed by heating the solution. The heated mixture is then passed via line 51 and valve 54 into the separator 55 where the sulphur dioxide is liberated and removed via line 57 and valve 56. The regenerated solution containing the nitrogen bases and water passes through line 59 controlled by valve 58 through cooler 60 where the mixture is cooled to substantially room temperature. The resulting nitrogen base-water mixture is passed by pump 61 through line 62 and valve 63 into line 64, thus completing the cycle. Make-up water is added through line 46 to keep the amount of water used substantially constant.

In carrying out the operations in absorption towers 20 and 50, it is preferable to maintain substantially identical conditions of operation such as temperature of absorption, ratio of sulphur dioxide to other gases in the feed stock to be treated, ratio of nitrogen bases to water and gas and liquid flow rates.

It will be observed that the complex nitrogen base mixture which I employ in my process for separating sulphur dioxide from gases is composed of a great many nitrogen bases, a few of which have been identified as 2,3-dimethylquinoline, 2,4-dimethylquinoline, 2,3,8-trimethylquinoline, 2,4,8-trimethylquinoline, 2,3-dimethyl-8-n-propylquinoline, 2,3,4,8 - tetramethylquinoline, 2,3,4-trimethyl-8-ethylquinoline, 2,3,4-trimethyl-8-n-propylquinoline, 2,3,8 - trimethyl - 4 - ethylquinoline, 2,4-dimethyl-8-s-butylquinoline, 2,3-dimethyl - 4,8 - diethylquinoline, 2,3-dimethyl-4-ethyl-8-n - propylquinoline, 2,3,4 - trimethyl-8-i-propylquinoline. In addition to the above, the complex mixture contains naphthenic as well as fused ring types of nitrogen bases. In general, the complex mixture is free from nitrogen bases heretofore employed for separating sulphur dioxide from gases such as aniline, dimethylaniline and quinoline.

By way of example, the following kinds of materials and conditions have been used. The nitrogen bases were obtained by extracting kerosene extract bottoms from petroleum with a dilute sulphuric acid solution; the extract was made alkaline with caustic solution and steam distilled. The nitrogen bases react with sulphuric acid in the following manner:

Nitrogen base+$H_2SO_4$→Nitrogen base.$H_2SO_4$

With alkali the nitrogen base.$H_2SO_4$ reacts as follows:

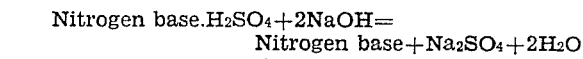

Nitrogen base.$H_2SO_4$+2NaOH=
Nitrogen base+$Na_2SO_4$+2$H_2O$

The crude product used had an A. P. I. gravity of 16.0 and a refractive index $n^{20}/D$ °C.=1.5265. Equal volumes of nitrogen bases and water were used; however, the amount of water has been varied between wide limits, the lower limit being reached when the sulphurous acid-nitrogen base compounds crystallize from solution as colorless crystals, this being detrimental to the process because of mechanical difficulties. Throughout the entire system substantially atmospheric pressure has been used and the absorption temperature has been approximately 80° F. The amount of rejected nitrogen bases which do not possess the desired absorption and regeneration properties, such as those separated in separator 25 has varied from 10 to 30 percent. The temperature of regeneration in separators 34 and 55 has varied from 190 to 210° F. and the time of regeneration at these temperatures has varied from 5 to 15 minutes. A prolonged regeneration period does not substantially affect the yield of sulphur dioxide or of nitrogen bases; however, the longer the regeneration period the greater will be the loss of nitrogen bases by distillation in the presence of the water and the greater the loss of water. Nitrogen bases which are lost during the regeneration may be practically quantitatively recovered by contacting the sulphur dioxide evolved from the nitrogen base solution with a dilute solution of sulphuric acid. The nitrogen bases react with the sulphuric acid forming a very stable compound which is decomposed to the original nitrogen base by means of caustic. Both concentrated and dilute sulphur dioxide containing gases have been used in this process. The percentage of sulphur dioxide removed varies considerably depending on the absorption conditions such as rates of gas and liquid flow. Gases containing 5 to 10 percent sulphur dioxide have been reduced to less than one-tenth percent sulphur dioxide.

The foregoing description of my invention is merely illustrative of one mode of carrying out my invention and is not to be taken as limiting my invention as many variations may be made thereon as will be recognized by those skilled in the art which are within the scope of the following claims.

I claim:

1. A process for separating sulphur dioxide from a gas containing the same which comprises contacting said gas with an aqueous mixture of nitrogen bases and thereby reacting said nitrogen bases with sulphur dioxide contained in said gas and subsequently heating the resulting aqueous solution of reacted nitrogen bases to dissociate said reacted nitrogen bases and liberate sulphur dioxide therefrom, said nitrogen bases contained in said aqueous mixture of nitrogen bases being obtained by a series of steps involving contacting an aqueous mixture of a crude mixture of nitrogen bases with the same gas from which it is subsequently desired to separate sulphur dioxide, under substantially the same conditions as employed in said first named contacting, thereby reacting a portion of said crude mixture of nitrogen bases with sulphur dioxide contained in said gas, then separating unreacted nitrogen bases from the aqueous solution of reacted nitrogen bases, then heating said aqueous solution of reacted nitrogen bases under substantially the same conditions employed in said first named heating thereby dissociating a portion of said reacted nitrogen bases, and then separating said dissociated nitrogen bases to be used in said process from the aqueous solution of undissociated reacted nitrogen bases.

2. A method for the treatment of a gas containing sulphur dioxide to separate the sulphur dioxide from other gaseous compounds contained therein comprising contacting said gas with an absorbing liquid which absorbs sulphur dioxide comprising water and a mixture of nitrogen bases and heating said absorbing liquid in which sulphur dioxide has been absorbed to liberate said absorbed sulphur dioxide, said mixture of nitrogen bases being obtained from a more complex mixture of nitrogen bases by a series of steps involving contacting the same gas from which it is subsequently desired to separate sulphur dioxide with an absorbing liquid comprising water and said more complex mixture of nitrogen bases under substantially the same conditions employed in said first named contacting to cause some of the nitrogen bases to react with sulphur dioxide, separating the unreacted nitrogen bases from the aqueous solution of reacted nitrogen bases, heating said aqueous solution under substantially the same conditions employed in said first named heating to dissociate some of said reacted nitrogen bases thereby liberating sulphur dioxide and separating said dissociated nitrogen bases to be used in said treatment, thereby leaving undissociated reacted nitrogen bases in said aqueous solution.

3. A process of recovering sulphur dioxide from a gas containing the same comprising contacting said gas with nitrogen bases in the presence of water to absorb sulphur dioxide, heating the aqueous absorption liquid to evolve sulphur dioxide, cooling said heated absorption liquid and recycling said cooled absorption liquid to the contacting step of said treatment, said nitrogen bases being obtained from a crude mixture of nitrogen bases by a series of steps involving contacting the same gas from which it is subsequently desired to recover sulphur dioxide with said crude mixture of nitrogen bases in the presence of water under conditions substantially the same as those employed in said first named contacting thereby reacting a portion of said crude mixture of nitrogen bases with sulphur dioxide contained in said gas, then separating unreacted nitrogen bases from the aqueous solution of reacted nitrogen bases under substantially the same conditions employed in said first named heating thereby dissociating a portion of said reacted nitrogen bases, and then separating said dissociated nitrogen bases to be used in said sulphur dioxide recovery process from the aqueous solution of undissociated reacted nitrogen bases.

THOMAS F. DOUMANI.